(12) United States Patent
Morgan

(10) Patent No.: US 10,202,782 B2
(45) Date of Patent: Feb. 12, 2019

(54) ENHANCED VISUAL SAFETY INDICATORS FOR PARKING SPACES

(71) Applicant: Clyde Morgan, Gardner, KS (US)

(72) Inventor: Clyde Morgan, Gardner, KS (US)

( * ) Notice: Subject to any disclaimer, the term of this patent is extended or adjusted under 35 U.S.C. 154(b) by 0 days.

(21) Appl. No.: 15/657,971

(22) Filed: Jul. 24, 2017

(65) Prior Publication Data
US 2018/0023312 A1 Jan. 25, 2018

Related U.S. Application Data

(60) Provisional application No. 62/366,280, filed on Jul. 25, 2016.

(51) Int. Cl.
*E04H 6/42* (2006.01)
*G09F 19/22* (2006.01)
*B60Q 9/00* (2006.01)
*G08G 1/16* (2006.01)

(52) U.S. Cl.
CPC ............ *E04H 6/426* (2013.01); *B60Q 9/002* (2013.01); *G08G 1/168* (2013.01); *G09F 19/22* (2013.01)

(58) Field of Classification Search
CPC ........ B60Q 9/002; E04H 6/426; G08G 1/168; G09F 19/22
USPC ...................................................... 340/932.2
See application file for complete search history.

(56) References Cited

U.S. PATENT DOCUMENTS

| 3,820,065 | A | * | 6/1974 | Koplewicz | .............. E04H 6/426 340/932.2 |
| 4,036,165 | A | * | 7/1977 | Wood | ...................... E04H 6/426 116/28 R |
| 4,341,488 | A | * | 7/1982 | Ryan | ...................... E01F 9/627 248/156 |
| 4,515,499 | A | * | 5/1985 | Furiate | .................... E01F 13/02 116/63 R |
| 4,879,554 | A | * | 11/1989 | Diaz-Silveira | ........ E01F 13/085 340/932.2 |

(Continued)

OTHER PUBLICATIONS

Moore, D., "Parking lot accidents: statistics, causes, and liability," printed Jul. 24, 2016, http://www.myparkingsign.com/blog/parking-lot-accidents/, 2 pages.

(Continued)

*Primary Examiner* — Ojiako K Nwugo
(74) *Attorney, Agent, or Firm* — Hovey Williams LLP

(57) ABSTRACT

A system of enhanced visual parking space safety indicators for assisting drivers of automobiles or operators of other vehicles to position their vehicles in parking spaces. First rear safety indicators are positioned on a vertical barrier, such as a wall or structure, located at a rear of the parking space, and demarcate a rear limit and an associated depth dimension, left and right limits and an associated width dimension, and a center of the parking space. Second upper safety indicators are positioned on an upper barrier, such as a ceiling, located above the parking space, and demarcate an upper limit and an associated height dimension, the left and right limits and the associated width dimension, and the center of the parking space. The enhanced visual parking space safety indicators may supplement or replace conventional safety surface line markings located on a lower surface of the parking space.

19 Claims, 8 Drawing Sheets

(56) References Cited

U.S. PATENT DOCUMENTS

| | | | | |
|---|---|---|---|---|
| 5,655,474 | A * | 8/1997 | Pretsch, Jr. | B60Q 1/48 |
| | | | | 116/28 R |
| 5,711,110 | A * | 1/1998 | Williams | E01F 13/085 |
| | | | | 49/25 |
| 6,142,702 | A * | 11/2000 | Simmons | E01F 13/123 |
| | | | | 340/932.2 |
| 6,204,754 | B1 * | 3/2001 | Berstis | B60Q 1/48 |
| | | | | 340/435 |
| 8,742,949 | B2 * | 6/2014 | Chang | E01F 13/046 |
| | | | | 340/5.7 |
| 2001/0037602 | A1 * | 11/2001 | Nickerson | E01F 13/065 |
| | | | | 49/49 |
| 2009/0238641 | A1 * | 9/2009 | Tamburro | E01C 11/222 |
| | | | | 404/7 |
| 2014/0197968 | A1 * | 7/2014 | Mantie | G01S 15/931 |
| | | | | 340/932.2 |

OTHER PUBLICATIONS

"The Two Most Common Vehicle Accidents," printed Jul. 24, 2016, http://sparebumper.com/index.php?act=viewProd&productId=30&catId=15, 2 pages.

Staff, "Top 10 Things to Know About Parking Lot Collisions," Jul. 2013, www.automotive-fleet.com/article/story/2013/07/top-10-things-to-know-about-parking-lot-collisions.aspx, 3 pages.

\* cited by examiner

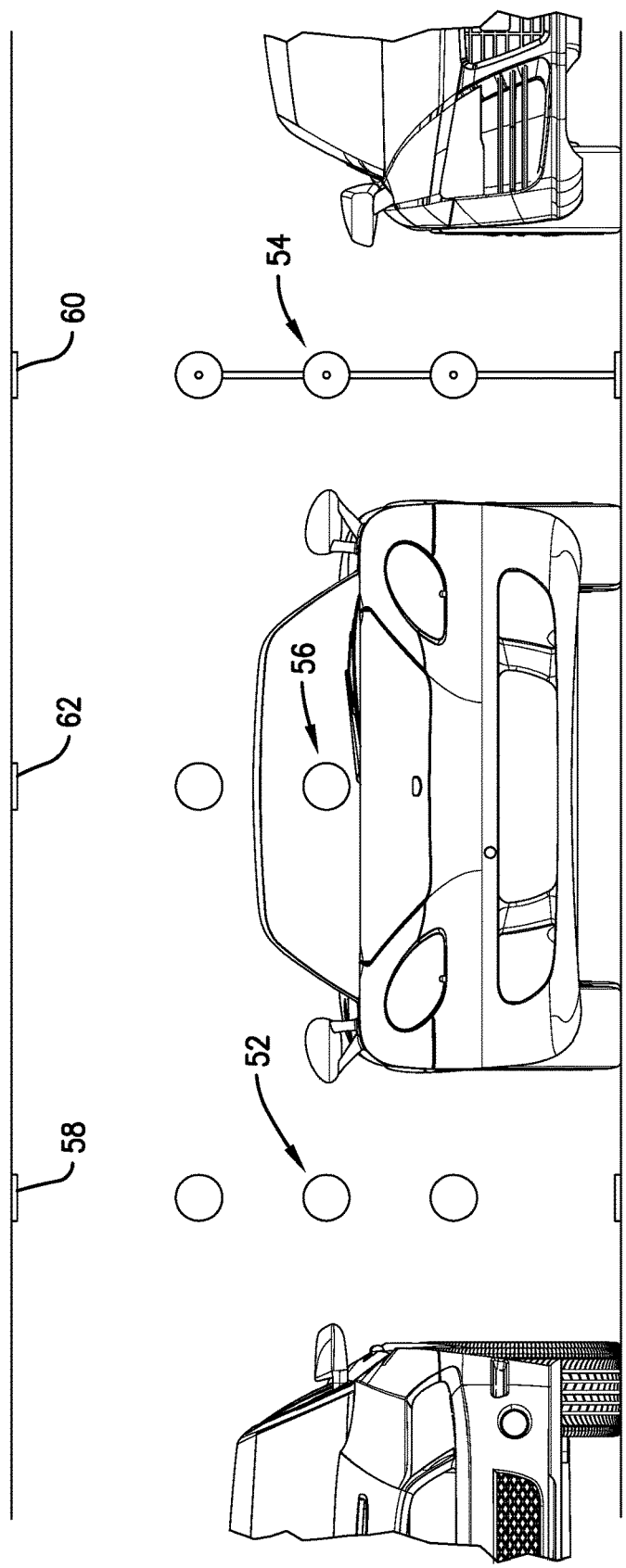

ENHANCED VISUAL SAFETY INDICATORS FOR PARKING SPACES

RELATED APPLICATION

The present U.S. non-provisional patent application is related to and claims priority benefit of a prior-filed U.S. provisional patent application having the same title, Ser. No. 62/366,280, filed Jul. 25, 2016. The entire content of the identified prior-filed application is hereby incorporated by reference into the present application as if set forth herein in its entirety.

FIELD

The present invention relates to visual guides for facilitating the positioning of vehicles, and more particularly, embodiments concern enhanced visual safety indicators for more effectively assisting drivers of automobiles and other operators of other vehicles to more properly and safely position their vehicles in parking spaces.

BACKGROUND

Safety surface line marking is ubiquitously used to demarcate parking spaces and assist drivers in parking their vehicles in those parking spaces. However, safety surface line marking is less or not at all effective for this purpose for drivers who unable to see the lines while parking their vehicles. There are many reasons why some drivers experience this problem, including the size of the driver, the size and/or design of the vehicle, the limited mobility or other physical imparity of the driver, the position of the lines, fading of the lines from wear, poor lighting, and the inexperience of the driver who is unable to judge distance or gauge the locations of the lines without actually seeing them.

All vehicles have side mirrors which can assist their drivers when backing into parking spaces, but which would have to be repositioned downwardly for parking and then returned to their original positions for driving, and are therefore inconvenient to use and of little practical value for this purpose. Further, while some vehicles have cameras that can display relevant information to assist their drivers when backing into parking spaces, such technology is present only on relatively expensive vehicles, or may be malfunctioning, and is therefore not generally available or not always reliable when it is available.

As a result, it is not uncommon for drivers to fail to properly center their vehicles in parking spaces. This may be particularly problematic for larger sport utility vehicles and trucks that have smaller margins within standard parking spaces. Reports by the insurance industry indicate that this often results in damage to both the incorrectly parked vehicles, adjacent correctly parked vehicles, and adjacent structures. This issue has been neglected by designers, owners, and operators of both private and commercial parking lots and garages, who have failed to address relevant insurance and law enforcement statistical findings. Similar problems exist for operators of other vehicles.

This background discussion is intended to provide information related to the present invention which is not necessarily prior art.

SUMMARY

Embodiments of the present invention solve the above-described and other problems and limitations by providing enhanced visual safety indicators for more effectively assisting drivers of cars and trucks and other operators of other vehicles (e.g., recreational vehicles, tractor-trailers, trailers of various kinds, boats and other watercraft, aircraft) to more properly and safely position their vehicles in parking spaces.

In a first embodiment of the present invention, a system is provided for visually defining a parking space to enhance an ability of an operator of a vehicle to park the vehicle in the parking space. This system may comprise one or more rear safety indicators positioned on a vertical barrier located at a rear limit of the parking space. In a second embodiment of the present invention, a system is provided for visually defining a parking space to enhance an ability of an operator of a vehicle to park the vehicle in the parking space. This system may comprise one or more upper safety indicators positioned on an upper barrier located at an upper limit of the parking space.

In an exemplary combination of aspects of the foregoing first and second embodiments, a system is provided for visually defining a parking space to enhance an ability of a driver of an automobile to park the automobile in the parking space, wherein two spaced apart conventional surface line markings located on a lower surface of the parking space demarcate a width dimension of the parking space. The system may comprise three or more first rear safety indicators and three or more second upper safety indicators. The three or more first rear safety indicators may be positioned on a vertical barrier located at a rear limit of the parking space, and extend from a lower height to an upper height on the vertical barrier to demarcate a depth dimension, the width dimension, and a center of the parking space. The three or more second upper safety indicators may be positioned on an upper barrier located at an upper limit of the parking space, and extend from a rearward position to a forward position on the upper barrier to demarcate a height dimension, the width dimension, and the center of the parking space.

Various implementations of the foregoing embodiments may include any one or more of the following additional features. The vehicle may be a car, truck, recreational vehicle, tractor-trailer, trailer of any variety (e.g., camper, cargo, motorcycle, horse, boat), watercraft, or aircraft, or a hybrid vehicle that is a combination of any thereof. The safety indicators may have a form such as a rectangle, circle, symbol, letter, number, or word, or a combination of any thereof. The safety indicators may be constructed of a material such as an adhesive tape, paint, engraving, architectural element, reflective material, artificially illuminated device (whether visible light or non-visible light for assisted-driving or self-driving vehicles), laser generator, or sound generating device (whether audible or non-audible sound for assisted driving or self-driving vehicles), or a combination of any thereof.

The rear safety indicators may demarcate a rear limit, a left limit and a right limit, and/or a center of the parking space. Relatedly, the rear safety indicators may include a left rear safety indicator which demarcates the left limit of the parking space, and a right rear safety indicator which demarcates the right limit of the parking space, wherein the left rear safety indicator and the right rear safety indicator cooperate to demarcate the width dimension of the parking space. The rear safety indicators may extend continuously or severally from a lower height to an upper height on the vertical barrier.

The upper safety indicators may demarcate an upper limit, a left limit and a right limit, and/or a center of the parking space. Relatedly, the upper safety indicators may include a left upper safety indicator which demarcates a left limit of the parking space, and a right upper safety indicator which demarcates a right limit of the parking space, wherein the left upper safety indicator and the right upper safety indicator cooperate to demarcate a width dimension of the parking space. The upper safety indicators may extend continuously or severally from a rearward position to a forward position on the horizontal upper barrier.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is a fragmentary elevation view of the system of enhanced visual safety indicators combining features of the implementations of FIGS. 3 and 5.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides improved visual guides for facilitating the positioning of vehicles. More particularly, embodiments provide enhanced visual safety indicators for more effectively assisting drivers of cars and trucks and other operators of other vehicles (e.g., recreational vehicles, tractor-trailers, trailers of various kinds (e.g., camper, cargo, motorcycle, horse, boat), boats and other watercraft, aircraft) to more properly and safely position their vehicles in parking spaces. Embodiments may facilitate both entering and exiting parking spaces, and may be employed in substantially any suitable location such as in public parking areas, private parking areas, garage parking areas, pathways, docks, and hangars, and particularly in any such location (e.g., hospitals, assisted living facilities, rehabilitation facilities, and/or in handicapped parking spaces anywhere) in which the elderly, disabled, or other persons with relevant physical limitations may need or desire to park their vehicles. The safety indicators advantageously enhance personal and property safety especially with regard to locating the center of a parking space and/or providing an aid in determining distance between a vehicle and a barrier such as curb, wall, fence, post, cable, sign, or other obstacle located proximate to the parking space.

Figure 1A:
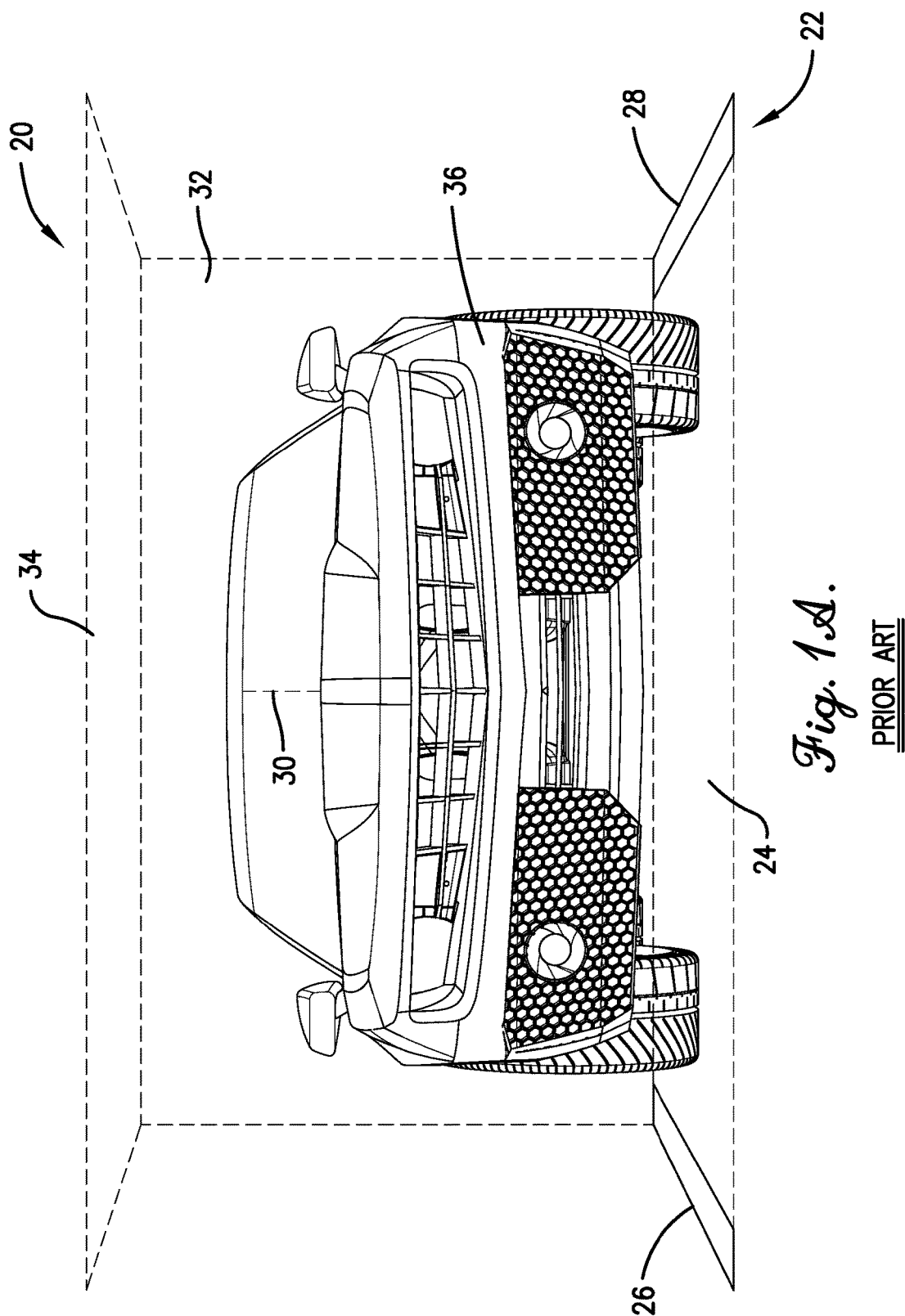
FIG. 1A (PRIOR ART) is a front perspective view of a parking space having only conventional safety surface line markings, and with the boundaries of the parking space shown in broken line.
Figure 1B:
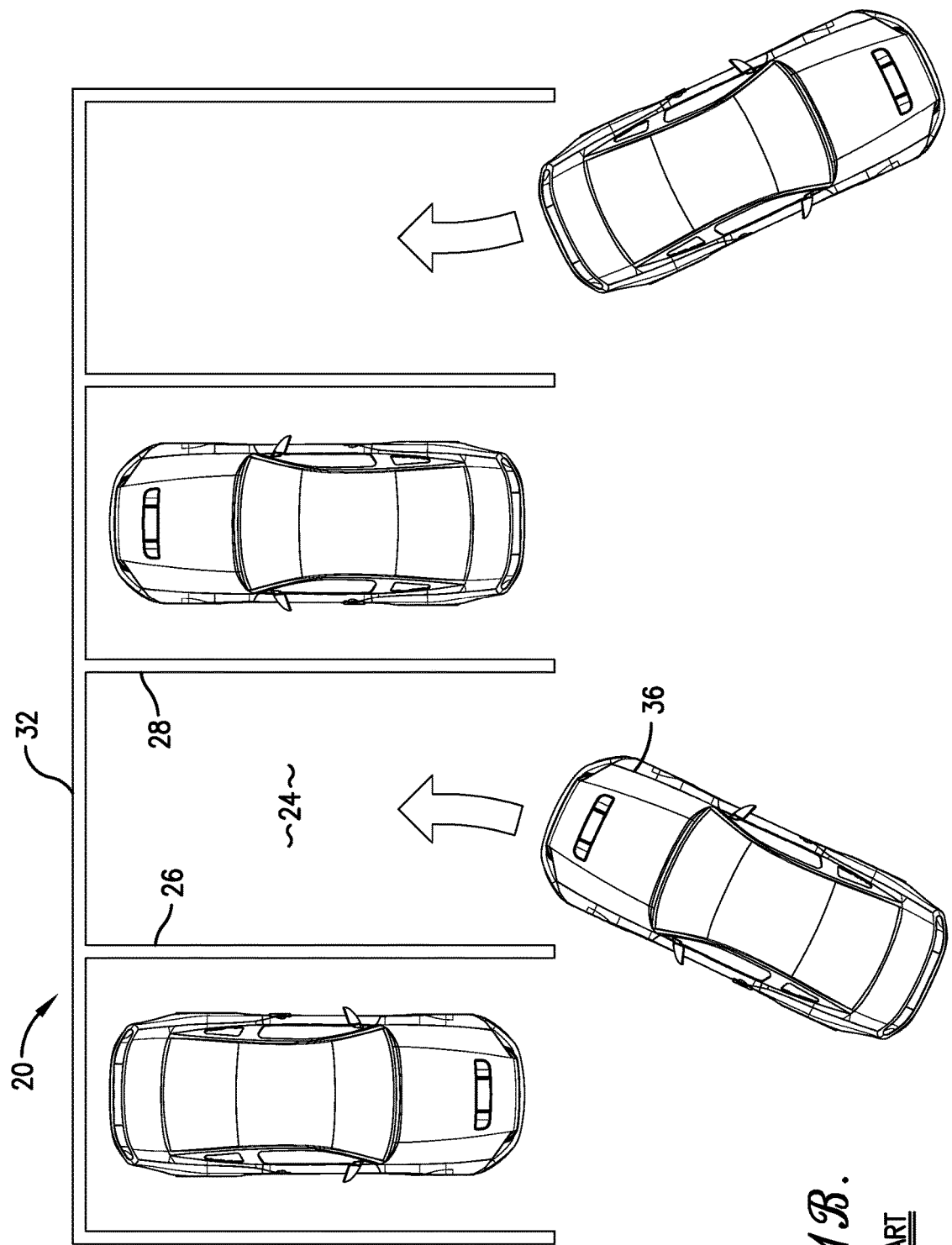
FIG. 1B (PRIOR ART) is a plan view of parking spaces having only conventional safety surface line markings.

Referring to FIGS. 1A and 1B (PRIOR ART), a parking space 20 is shown having only conventional safety surface line markings 22, and with the boundaries of the parking space shown in broken line. In particular, the parking space 20 may have a lower surface 24, a left (or port) limit 26, a right (or starboard) limit 28, a center 30 located between the left and right limits 26,28, a rear limit 32, and an upper limit 34. As used herein, the "rear" limit 32 is defined as the opposite end of the parking space 20 from where the vehicle ordinarily enters and leaves the parking space 20, regardless of whether the vehicle enters the parking space with a forward or backward orientation. To be clear, if the entrance of the parking space 20 is considered an "open" end for receiving the vehicle, then the rear limit 32 may be considered a "closed" end. Only the left and right limits 26,28 may be indicated by the conventional line markings 22 applied to the lower surface 24 to the parking space 20, and these may be difficult or impossible to see for a driver of a vehicle 36 for a variety of different reasons. In various additive or alternative implementations, the visual safety indicators of the present invention may be located vertically and/or horizontally, behind and/or above the parking space 20, and/or to the sides of and/or centered on the parking space 20 so as to replace or supplement the conventional line markings 22 with more clearly visible and effective guides for the driver to more successfully park the vehicle 36 near or in the optimal center 30 of the space 20, whether maneuvering the vehicle 46 forwardly or backwardly into the space 20.

In more detail, referring to FIGS. 2-7, embodiments of a system of enhanced visual safety indicators 40 are shown in an exemplary operating environment for more effectively assisting an operator of a vehicle 36 to more properly and safely park the vehicle 46 in the parking space 20. Broadly, the system may include one or more of the visual parking space safety indicators 40 which may replace or supplement the two conventional line markings 22 located on the surface 24 of the parking space 20.

Figure 2:
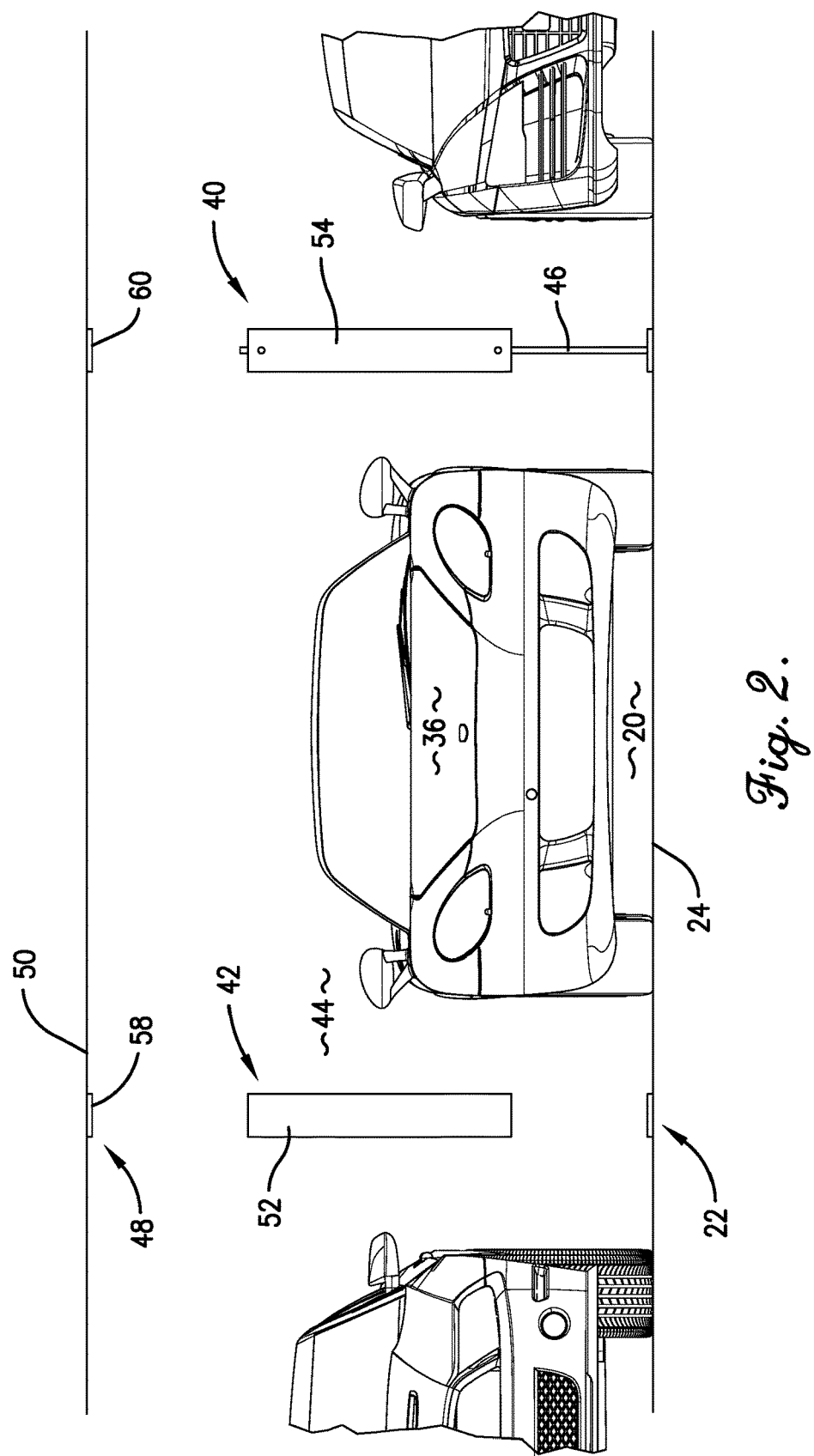
FIG. 2 is a fragmentary elevation view of a first implementation of a first embodiment of a system of enhanced visual safety indicators for more effectively assisting an operator of a vehicle to more properly and safely position their vehicle in a parking space.
Figure 3:
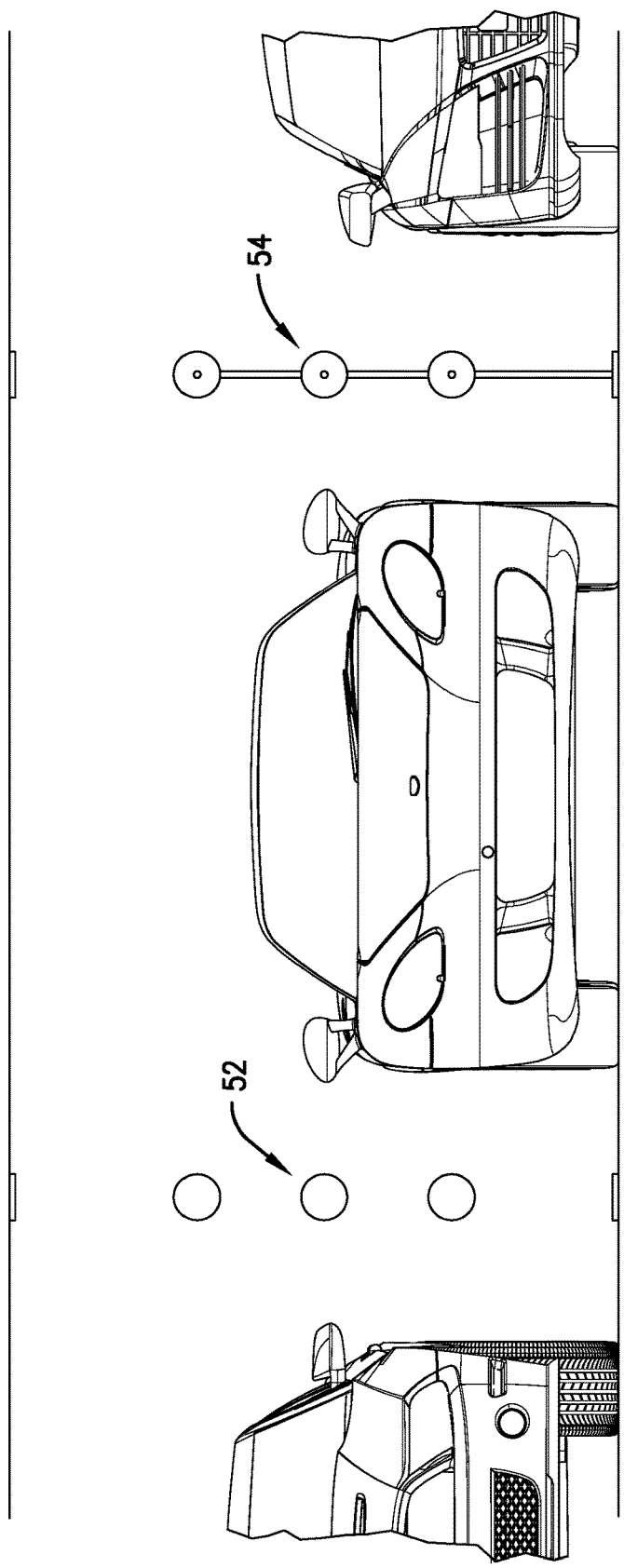
FIG. 3 is a fragmentary elevation view of a second implementation of the first embodiment of the system of enhanced visual safety indicators.
Figure 4:
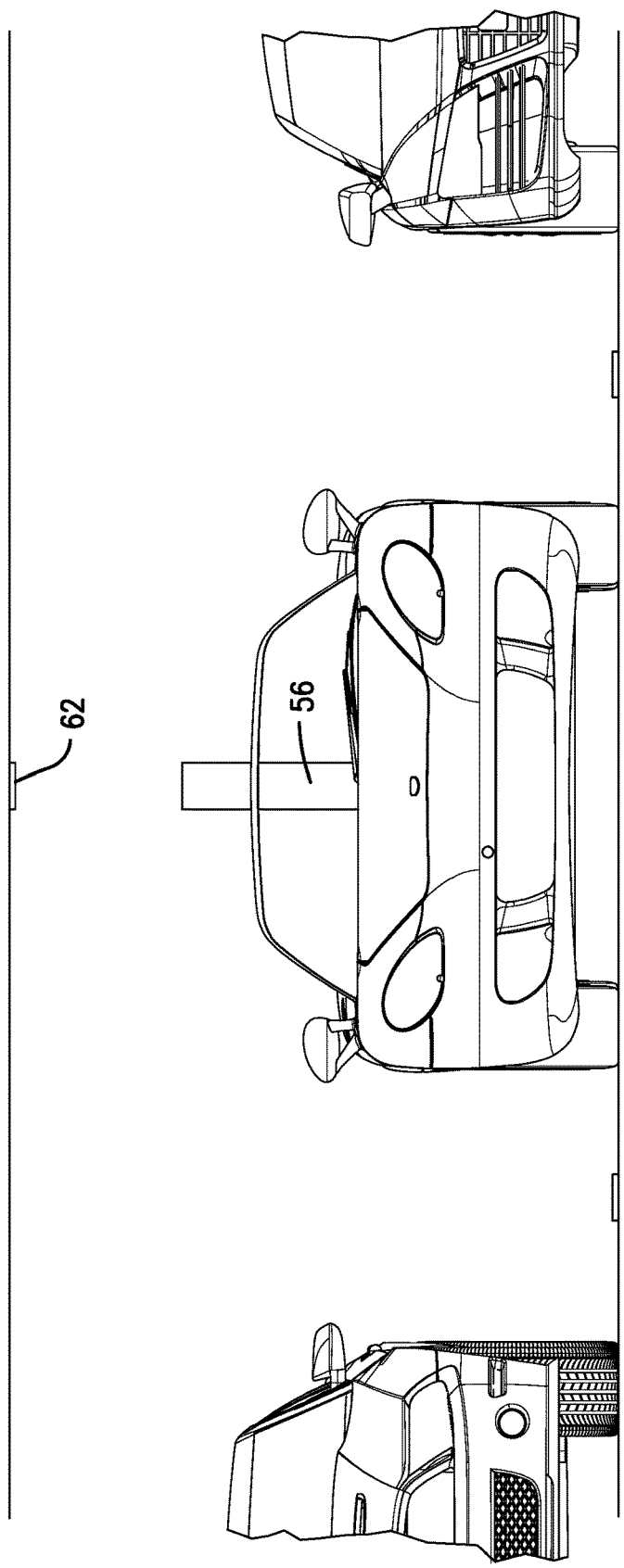
FIG. 4 is a fragmentary elevation view of a first implementation of a second embodiment of the system of enhanced visual safety indicators.
Figure 5:
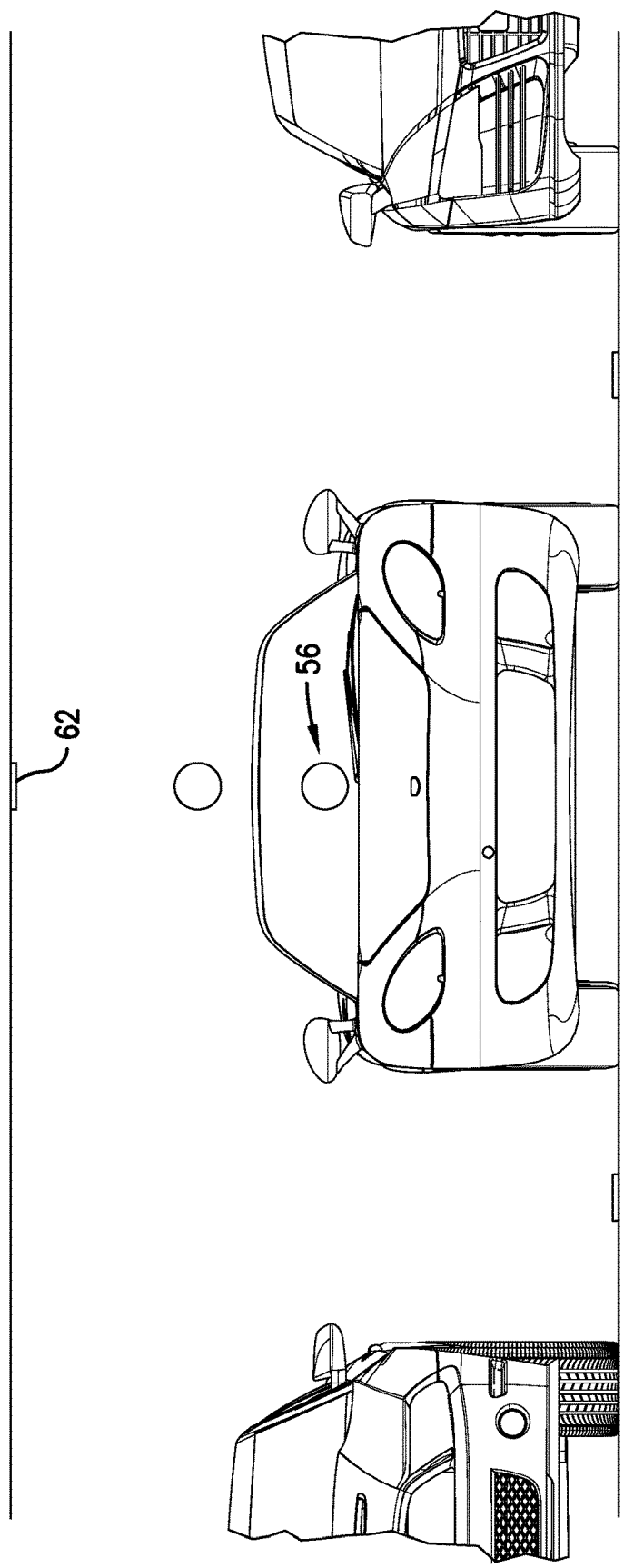
FIG. 5 is a fragmentary elevation view of a second implementation of the second embodiment of the system of enhanced visual safety indicators.
Figure 6:
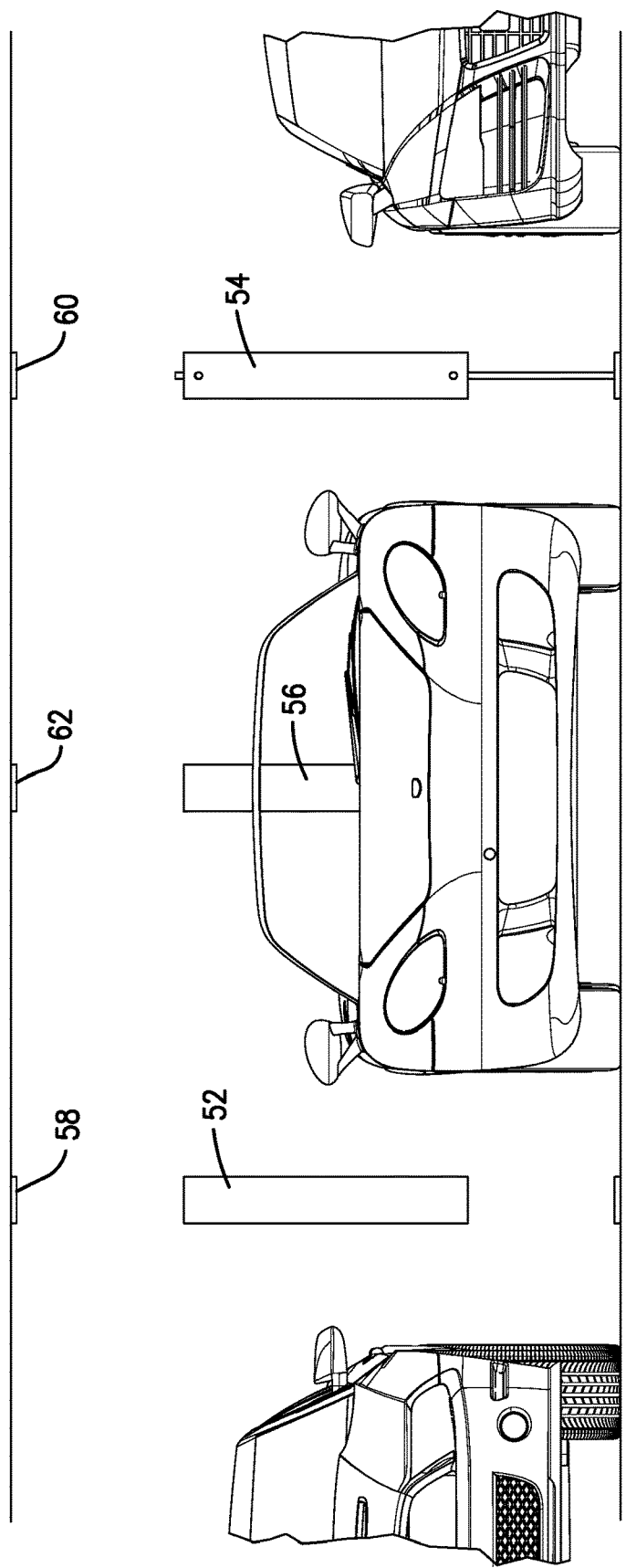
FIG. 6 is a fragmentary elevation view of the system of enhanced visual safety indicators combining features of the implementations of FIGS. 2 and 4.

The safety indicators 40 may take substantially any suitable form or combinations of forms, such as rectangular (as seen in FIGS. 2, 4, and 6), round (as seen in FIGS. 3, 5, and 7), symbolic (e.g., arrows), and/or alphanumeric (e.g., letters, numbers, and/or words), and combinations thereof. The safety indicators 40 may be constructed of substantially any suitable material or design or combination of materials or designs, such as adhesive tapes, paints, engravings, architectural elements, reflective materials, artificially illuminated devices (whether visible light or non-visible light for assisted-driving or self-driving vehicles), laser generators, or sound generating devices (whether audible or non-audible sound for assisted driving or self-driving vehicles), or a combination of any thereof.

The safety indicators 40 may extend from a lower or first height or position to an upper or second height or position in order to ensure visibility for difference sized drivers in different sized vehicles. More generally, the safety indicators 40 may be adapted for use with substantially any suitable vehicle, such as automobiles (e.g., cars, sport utility vehicles, trucks, vans), recreational vehicles, tractor-trailers, trailers of various kinds (e.g., camper, cargo, motorcycle, horse, boat), watercraft (in which case the parking space may be at a dock), and/or aircraft (in which case the parking space 20 may be in a hanger), and/or hybrid vehicles which are combinations thereof. Further, in addition to being more visible to unassisted drivers, one or more of the safety indicators 40 may be positioned so as to be visible by vehicle cameras and/or normally positioned vehicle side and/or rearview mirrors.

The visual parking space safety indicators 40 may include one or more first rear safety indicators 42 which may be mounted on a vertical barrier (e.g., a curb or wall 44 or structure 46 (such as a post or cable, whether singular or part of, e.g., a fence)) located at or near the rear limit 32 of the parking space 20, and/or one or more second upper safety indicators 48 which may be positioned on a horizontal upper barrier (e.g., a ceiling 50 or structure (such as the aforementioned post or cable)) located at or near the upper limit 34 of the parking space 20.

The first rear safety indicators 42 may extend continuously (as seen in FIGS. 2, 4, and 6) or severally (and seen in FIGS. 3, 5, and 7) from a lower height to an upper height on the vertical barrier 44,46, thereby maximizing their visibility to operators of different seizes and abilities in vehicles of different sizes and designs. The first rear safety indicators 42 may demarcate the rear limit 32 of the parking space 20. Additionally or alternatively, the first rear safety indicators 42 may demarcate the left and right limits 26,28 of the parking space 20. For example, the first rear safety indicators 42 may include a left rear safety indicator 52 which demarcates the left limit 26 of the parking space 20, and a right rear safety indicator 54 which demarcates the right limit 28 of the parking space 20, such that the left and right rear safety indicators 52,54 cooperate to demarcate a width dimension of the parking space 20. Additionally or alternatively, the first rear safety indicators 42 may include a center rear safety indicator 56 (seen in FIGS. 4-7) positioned on the vertical barrier 44,46, which demarcates the center 30 of the parking space 20.

The second upper safety indicators 48 may extend continuously (as seen in FIGS. 2, 4, and 6) or severally (and seen in FIGS. 3, 5, and 7) from a rearward position to a forward position on the upper horizontal barrier 50, thereby maximizing their visibility to operators of different seizes and abilities in vehicles of different sizes and designs. The second upper safety indicators 28 may demarcate the upper limit 34 of the parking space 20. Additionally or alternatively, the second upper safety indicators 48 may demarcate the left and right limits 26,28 of the parking space 20. For example, the second upper safety indicators 48 may include a left upper safety indicator 58 which demarcates the left limit 26 of the parking space 20, and a right upper safety indicator 60 which demarcates the right limit 28 of the parking space 20, such that the left and right upper safety indicators 58,60 cooperate to demarcate the width dimension of the parking space 20. Additionally or alternatively, the second upper safety indicators 48 may include a center upper safety indicator 62 (seen in FIGS. 4-7) positioned on the horizontal upper barrier 50, which demarcates the center 30 of the parking space 20.

Some or all aspects of the first implementation of the first embodiment seen in FIG. 2, which includes the continuous rectangular left and right rear safety indicators 52,54, and the first implementation of the second embodiment, which includes the continuous rectangular center rear safety indicator 56, seen in FIG. 4, may be incorporated into a single system, such as is shown in FIG. 6. Similarly, some or all aspects of the second implementation of the first embodiment seen in FIG. 3, which includes the several round left and right upper safety indicators 52,54, and the second implementation of the second embodiment, which includes the several round center upper safety indicator 56, seen in FIG. 5, may be incorporated into a single system, such as is shown in FIG. 7. Other combinations of these implementations and embodiments are similarly possible.

Thus, embodiments of the present invention provide substantial advantages for more clearly and effectively assisting operators to more properly and safely park their vehicles in parking spaces, including providing a practical and cost-effective solution for reducing damage to vehicles and structures resulting from poorly parked vehicles.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for visually defining a parking space to enhance an ability of an operator of a vehicle to park the vehicle in the parking space, the system comprising two or more rear safety indicators positioned on a vertical barrier located at a rear limit of the parking space, wherein the two or more rear safety indicators demarcate a left limit and a right limit of the parking space.

2. The system as set forth in claim 1, wherein the vehicle is selected from the group consisting of: cars, trucks, recreational vehicles, tractor-trailers, trailers of various kinds, watercraft, and aircraft, and hybrid vehicles that are combinations thereof.

3. The system as set forth in claim 1, wherein the two or more rear safety indicators include a form that is selected from the group consisting of: rectangles, circles, symbols, letters, numbers, and words, and combinations thereof.

4. The system as set forth in claim 1, wherein the two or more rear safety indicators are constructed of a material that is selected from the group consisting of: adhesive tapes, paints, engravings, architectural elements, reflective materials, artificially illuminated devices, sound generating devices, and combinations thereof.

5. The system as set forth in claim 1, wherein the two or more rear safety indicators demarcate a rear limit of the parking space.

6. The system as set forth in claim 1, wherein the two or more rear safety indicators include a left rear safety indicator which demarcates the left limit of the parking space, and a right rear safety indicator which demarcates the right limit of the parking space, wherein the left rear safety indicator and the right rear safety indicator cooperate to demarcate a width dimension of the parking space.

7. The system as set forth in claim 1, wherein the two or more rear safety indicators demarcate a center of the parking space.

8. The system as set forth in claim 1, wherein the two or more rear safety indicators extend continuously from a lower height to an, upper height on the vertical barrier.

9. A system for visually defining a parking space to enhance an ability of an operator of a vehicle to park the vehicle in the parking space, the system comprising one or more upper safety indicators positioned on a horizontal upper barrier located at an upper limit above the parking space.

10. The system as set forth in claim 9, wherein the vehicle is selected from the group consisting of: cars, trucks, recreational vehicles, tractor-trailers, trailers of various kinds, watercraft, and aircraft, and hybrid vehicles that are combinations thereof.

11. The system as set forth in claim 9, wherein the one or more upper safety indicators include a form that is selected from the group consisting of rectangles, circles, symbols, letters, numbers, and words, and combinations thereof.

12. The system as set forth in claim 9, wherein the one or more upper safety indicators are constructed of a material that is selected from the group consisting of: adhesive tapes, paints, engravings, architectural elements, reflective materials, artificially illuminated devices, sound generating devices, and combinations thereof.

13. The system as set forth in claim 9, wherein the one or more upper safety indicators demarcate an upper limit of the parking space.

14. The system as set forth in claim 9, wherein the one or more upper safety indicators demarcate a left limit and a right limit of the parking space.

15. The system as set forth in claim 14, wherein the one or more upper safety indicators include a left upper safety indicator which demarcates the left limit of the parking space, and a right upper safety indicator which demarcates the right limit of the parking space, wherein the left upper safety indicator and the right upper safety indicator cooperate to demarcate a width dimension of the parking space.

16. The system as set forth in claim 9, wherein the one or more upper safety indicators demarcate a center of the parking space.

17. The system as set forth in claim 9, wherein the one or more upper safety indicators extend continuously from a rearward position to a forward position on the horizontal upper barrier.

18. A system for visually defining a parking space to enhance an ability of a driver of an automobile to park the automobile in the parking space, wherein two spaced apart conventional surface line markings located on a lower surface of the parking space demarcate a width dimension of the parking space, and the system comprising:
   three or more first rear safety indicators positioned on a vertical barrier located at a rear limit of the parking space, and extending from a lower height to an upper height on the vertical barrier to demarcate a depth dimension, the width dimension, and a center of the parking space; and
   three or more second upper safety indicators positioned on an upper barrier located at an upper limit above the parking space, and extending from a rearward position to a forward position on the upper barrier to demarcate a height dimension, the width dimension, and the center of the parking space.

19. The system as set forth in claim 18, wherein—
   the three or more first rear safety indicators and the three or more second upper safety indicators include a form that is selected from the group consisting of: rectangles, circles, symbols, letters, numbers, and words, and combinations thereof; and
   the three or more first rear safety indicators and the three or more second upper safety indicators are constructed of a material that is selected from the group consisting of: adhesive tapes, paints, engravings, architectural elements, reflective materials, artificially illuminated devices, sound generating devices, and combinations thereof.

* * * * *